Nov. 22, 1960    P. M. STIGLIC ET AL    2,961,166
PNEUMATIC TEMPERATURE SENSOR
Filed April 8, 1958
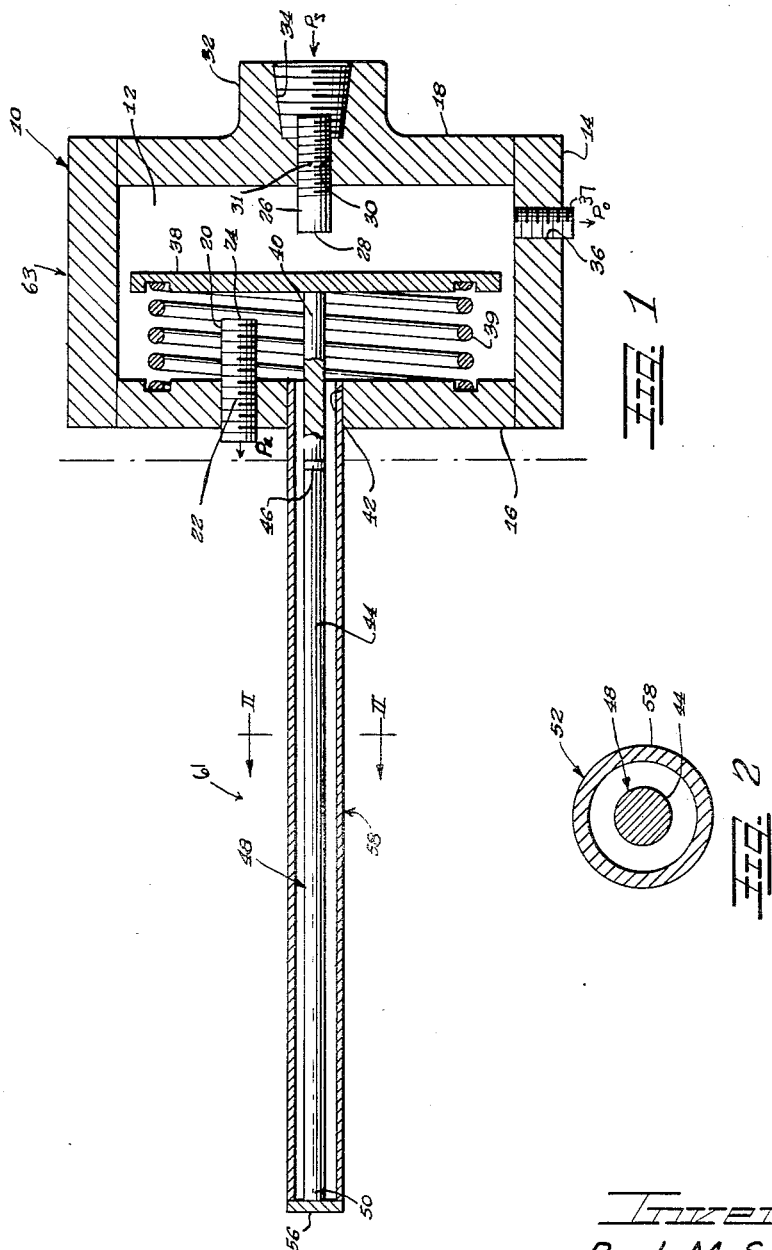
Inventors
Paul M. Stiglic
Gene L. Mrava

United States Patent Office 2,961,166
Patented Nov. 22, 1960

2,961,166

PNEUMATIC TEMPERATURE SENSOR

Paul M. Stiglic, Wickliffe, and Gene L. Mrava, Cleveland, Ohio, assignors to Thompson Ramo Wooldridge Inc., a corporation of Ohio Filed Apr. 8, 1958, Ser. No. 727,123

2 Claims. (Cl. 236—102)

The present invention relates to an improved device for producing an output pressure signal which is responsive to a temperature change. Particularly, the invention relates to an improved pneumatic control device of enhanced sensitivity providing an output pressure signal from an input temperature signal, and which is extremely accurate and responsive to temperature change.

A control device of this type is effective to provide output pressure for regulating engines, machine controls, atomic reactor controls and like devices which are to be regulated in accordance with a control temperature. An important feature of the invention is the provision of a control which is extremely sensitive to small changes in temperature. Another feature is the provision of a control providing a pressure output and being extremely reliable, avoiding such difficulties as clogging and being relatively insensitive to foreign materials such as dust and dirt which may be entrained in the fluid flow system.

Another important feature of the invention is the ability of the control to deliver a large flow of fluid at extremely accurately controlled pressures which are very responsive to input control temperature variations.

An object of the invention is to provide an improved control device which is sensitive to small variations in temperature and which is capable of delivering a large flow of fluid which is an extremely accurate function of temperature.

Another object of the invention is to provide an improved temperature sensor which will respond only to temperatures in a sensing area and will not be affected temperatures in other areas such as locations to where a temperature controlled signal is sent.

A further object of the invention is to provide a temperature sensing device of improved construction which is rugged and durable and capable of use in adverse environments without requiring adjustment.

Other features, objects and advantages will become more apparent with the teachings of the principles of the invention in connection wtih the showing and description of the preferred embodiments thereof in the specification, claims and drawings, in which:

Figure 1 is a vertical sectional view taken through a pneumatic temperature sensor embodying the principles of the present invention; and, Figure 2 is a vertical sectional view taken along line II—II of Figure 1.

As shown in the drawings:

With reference to Figures 1 and 2, wherein like numerals are used to signify like parts, there is shown a casing or housing 10 which is sealed against leakage and which defines a chamber 12 therein. The casing 10 is shown having an outer wall 14 which may be cylindrical in shape and which receives end walls 16 and 18. The end walls are sealed in place after assembly of the mechanism to seal the chamber 12 within the casing.

Communicating with the chamber 12 is an inlet tube 26 which projects into the casing and is mounted in an opening 30 in the end wall 18. The tube 26 is provided with threads 31 for threading the tube into the opening 30 which is also threaded. The end wall 18 has a boss 32 with an opening which is a continuation of opening 30 and has internal threads 34 for connecting a pressure supply conduit which may supply a flow of air at a constant pressure $Ps$. The inlet tube 26 has an inlet orifice 28 for the flow of fluid, such as the flow of control air into the chamber 12.

Also communicating with the chamber 12 is a discharge or outlet tube 20. The outlet tube is mounted in the end wall 16 and projects into the chamber 12. At the end of the tube is an outlet orifice 24 through which fluid flows from the chamber out through the tube. The tube 20 is provided with threads 22 for threading the tube to the end wall 16. A conduit may be connected to the tube 20 to carry away the flow of air, but the air may discharge into the atmosphere and is released at atmospheric pressure $Pa$.

Another opening 36 leads from the chamber 12 and is illustrated as being formed in the wall 14 of the casing. The opening 36 is shown as being threaded and receives a connector 37 for the connection of a signal receiving conduit. Opening 36 is spaced from the inlet and outlet orifices 28 and 24 and is provided for an output pressure signal $Po$ and will receive a signal pressure from the chamber 12 in accordance with the temperature variation.

The pressure signal received at the outlet opening 36 is dependent on the rate of flow through the inlet orifice 28 and out of the outlet orifice 24. The flow through these orifices is simultaneously controlled by a shiftable valve member 38 shown in the form of a circular plate which moves laterally within the chamber 12 between the inlet and outlet orifices 28 and 24. It will be seen that as the plate 38 moves closer toward the inlet orifice 28, it will restrict the flow into the chamber and it will simultaneously move away from the outlet orifice 24 to increase the flow from the chamber through the outlet orifice. Positioning the shiftable plate 38 closer toward the outlet orifice 24 will reduce the flow from the chamber and will increase the flow into the chamber from the inlet orifice 24. A coiled compression spring 39 is located between the plate 38 and the wall 16. The spring keeps the inner rod 40 from rubbing on the tube 58 and centers the plate 38. For operation of the device a pressure supply is supplied to the inlet tube 26 at a constant pressure and the pressure at the pressure signal outlet opening 36, $Po$, will vary in accordance with the position of the plate 38.

It will be seen that the valve plate could be provided in other forms such as in the shape of a flat, rectangular bar which is of sufficient width to extend across the widest of the orifices 24, 28. Also, other forms of mountings could be provided for the bar whereby it would shift laterally between the orifices to control the flow therethrough.

The shiftable value control plate 38 is illustrated as connected to an expansion rod 48. The expansion rod extends through an opening 42 in the wall 16 of the casing.

The expansion rod 48 is formed of two parts 40 and 44 which are connected by a weld-joint 46. The inner part 40 which is connected to the plate 38 is formed of the same material as the housing 10. The outer part 44 of the rod 48 is formed of a low expansion material. The inner part 40 is in the zone 63 which is not subject to temperature variations to be measured and the outer part 44 is in the zone 61 where the temperature is to be measured. A broken line illustrates the separation of the temperature sensing zone 61 and the pressure signal generating zone 63.

The end 50 of the part 44 of the expansion rod 48 is anchored such as by being connected to an expansion tube 58. The tube 58 is hollow in shape and is mounted coaxially with the rod to surround it. At the outer end, the tube 58 is connected to a circular disc 56, which is welded to the end of the tube and to the expansion rod 44. The expansion tube has a coefficient of expansion different than the rod and the differential of expansion will be transmitted to the valve plate 38. In the form shown, the tube is of the same material as the housing 10 and part 40 of the valve rod and all parts of the mechanism are of the same expansion rate except the valve rod part 44 which has a low coefficient of expansion. The inner end of the expansion tube 58 is secured in the opening 42 in the end wall 16 of the casing. As an example, the rod 44 may be formed of a #410 stainless steel or other low expanding type metal. The expansion tube 58 is formed of material such as a #303 or #304 stainless steel or other high expanding metal. The other parts of the sensor may be formed of the same material as the tube. It will be seen that in some constructions, e.g. where an inverse pressure signal is to be generated, the rod could be made of a high expansion material and the tube of a low expansion material.

This arrangement of steels gives the sensor a "lead" effect, i.e., an initial overshoot of the subjected temperature. This lead effect will enable the observer of the output signal to realize more quickly that the temperature is changing.

In operation of the mechanism, a supply of control fluid such as air is furnished to the inlet tube 26 at constant pressure to flow into the inlet orifice 28. The air will flow out through the outlet orifice 24 with the pressure within the chamber 12 being controlled by the position of the valve plate 38. The pressure will be sensed through the opening 36. Temperature variations in the zone 63 of the housing 10 will not vary the position of the valve control plate 38, since the casing 10, and the rod 40 are all formed of the same material having the same coefficient of expansion. With change of temperature in the temperature sensitive area 61, the expansion rod 44 and the expansion tube 58 will expand at different rates with temperature change, and this will vary the position of the plate 38. For example, with increase in temperature, inasmuch as the tube expands more than the rod, the rod 48 will draw the valve plate 38 to the left, thereby increasing the pressure within the chamber 12. This increased pressure will be detected at the outlet opening 36. A decrease in temperature in the temperature sensitive area 61 will have an opposite effect and will lower the pressure within the chamber 12.

Thus, it will be seen that we have provided an improved pneumatic temperature sensor which meets the objectives and advantages hereinbefore set forth. The mechanism is extremely reliable in operation and is capable of producing accurate, sensitive response to temperature change. Furthermore, with the valve structure shown, a wide range of pressure variations is obtainable with small variations in temperature.

It will be recognized that although advantages are present with the parts in the form shown, variations may be adapted within the scope of the invention. The tube 58 and the rod 44, for example, may be varied in their structural forms in some instances, retaining the principles of differential expansion.

We have, in the drawings and specification, presented a detailed disclosure of the preferred embodiment of the present invention, and it is to be understood that we do not intend to limit the present invention to the specific form disclosed, but intend to cover all modifications, changes and alternative constructions and methods falling within the scope of the principles taught by our invention.

We claim as our invention:

1. A temperature responsive pressure signal device comprising in combination a closed casing having walls forming a sealed chamber therein, first and second conduits communicating with said chamber with the first conduit having an inlet orifice within the chamber and the second conduit having an outlet orifice within the chamber, said orifices facing each other and located in spaced relationship, a movable plate positioned between the orifices and shiftable relative thereto to control the flow from the inlet orifice into the chamber and the flow from the chamber through the outlet orifice, a temperature responsive control rod connected to said plate and passing through an opening in a wall of the casing, a temperature responsive tube surrounding the rod and connected at one end to the rod and at the other end to the casing and having a different expansion coefficient than the rod whereby a temperature change will cause movement of the plate to determine the flow through said orifices, and a coiled spring of large diameter substantially concentric with the rod and located between the plate and a wall of the casing to center the rod relative to the opening in the casing wall, one of said orifices located within the spring diameter, said spring moving the plate in a direction to place a slight tension on the rod.

2. A temperature responsive pneumatic control device comprising a sealed casing defining a control chamber therein, an inlet conduit opening into said chamber and terminating in an inlet orifice, an outlet conduit leading from the chamber and having an outlet orifice for receiving flow from the chamber, said orifices located in spaced apart facing relationship, means defining an opening from the chamber for receiving an output pressure signal therefrom and being spaced from said inlet and said outlet orifices, a substantially flat broad orifice control valve plate member positioned in the chamber with one surface facing said inlet orifice and the other surface facing said outlet orifice for movement therebetween to control flow through said orifices, a rod extending through a wall of the chamber having an inner first portion formed of a first material connected to said valve plate member and having an outer second portion formed of a second material which is thermally expansible, an enclosing tube surrounding the second portion of said rod and at least a portion of said first rod portion and mounted on said housing with the outer end of said tube connected to the outer end of said second portion of the rod, said tube formed of a thermally expansible material having a coefficient of expansion different than said second material whereby movement will be transmitted to said valve plate member with temperature change of the tube and the outer portion of the rod, a broad coil compression spring coaxial with said rod and extending substantially to the outer edges of the valve plate member for centering said rod in said tube and providing a lateral balance for the valve plate member and guiding said rod and plate with thermal expansion and contraction of the rod and tube, means defining a first annular groove in the valve plate receiving one end of the spring, and means defining a second annular groove in the inner surface of a wall of the chamber coaxial with the first groove and receiving the other end of the spring.

References Cited in the file of this patent

UNITED STATES PATENTS

| | | |
|---|---|---|
| 1,278,001 | Parisen | Sept. 3, 1918 |
| 2,125,081 | Moore | July 26, 1938 |
| 2,411,295 | Saballus et al. | Nov. 19, 1956 |
| 2,786,713 | Donaldson | Mar. 26, 1957 |
| 2,843,325 | Greenwald et al. | July 15, 1958 |

FOREIGN PATENTS

| | | |
|---|---|---|
| 64,707 | France | Oct. 7, 1953 |
| 676,445 | Germany | May 11, 1939 |